United States Patent [19]

Lasar, III

[11] Patent Number: 4,509,860
[45] Date of Patent: Apr. 9, 1985

[54] DUAL ACTION MIXER

[75] Inventor: William Lasar, III, Downey, Calif.

[73] Assignee: Lasar Manufacturing Co., Calif.

[21] Appl. No.: 491,045

[22] Filed: May 3, 1983

[51] Int. Cl.³ .............................. A21C 1/00; B01F 7/08
[52] U.S. Cl. .................................... 366/99; 366/185; 366/296
[58] Field of Search ................ 366/296, 309, 320, 185, 366/99, 186, 96, 98, 64, 66, 292–295, 331; 241/101.5, 101.6, 98

[56] References Cited

U.S. PATENT DOCUMENTS

| 2,784,950 | 3/1957 | Bakewell | 366/296 |
| 2,784,951 | 3/1957 | Bakewell | 366/296 |
| 3,722,834 | 3/1973 | Bakewell | 366/99 |
| 3,799,459 | 3/1974 | Bakewell | 366/186 |

Primary Examiner—Timothy F. Simone
Attorney, Agent, or Firm—Pretty, Schroeder, Brueggemann & Clark

[57] ABSTRACT

An improved dual action mixer is provided of the type having simultaneously counterrotatable mixing elements mounted within a mixer drum, wherein the mixing elements are relatively easily removable for cleaning purposes. One mixing element comprises an array of paddles carried by a driven shaft having one end threaded to a motor drive shaft at one end wall of the drum and an opposite end rotatably support with axial clearance within a bearing block movably mounted on the opposite drum end wall. The other mixing element comprises a pair of support hubs carried rotatably about the driven shaft and secured to radiating scraper arms having their outer ends joined to mixer blades extending with arcuate contour generally between the drum end walls, wherein one support hub is held axially by a shoulder on the driven shaft in engagement with a drive collar disposed about the drive shaft for opposite rotation thereto. The two mixing elements are removable quickly and easily by unthreading the driven shaft from the drive shaft, followed by retraction of the bearing block from the drum end wall and disengagement of the driven support hub from the drive collar to permit free withdrawal of the mixing elements from the drum for cleaning.

31 Claims, 7 Drawing Figures

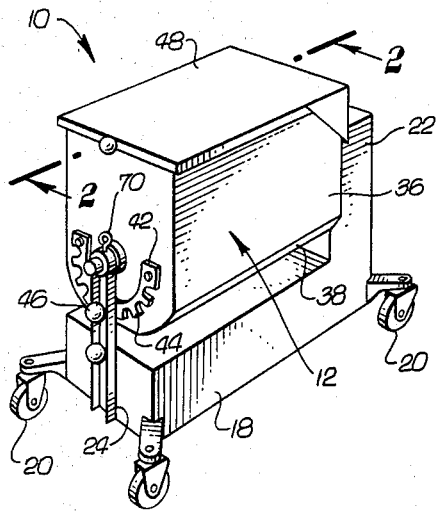
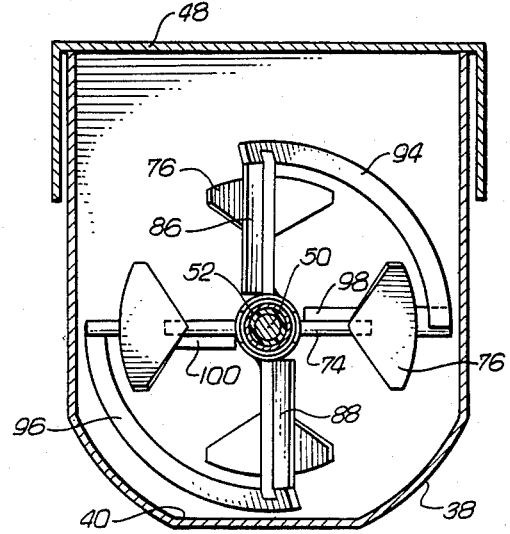
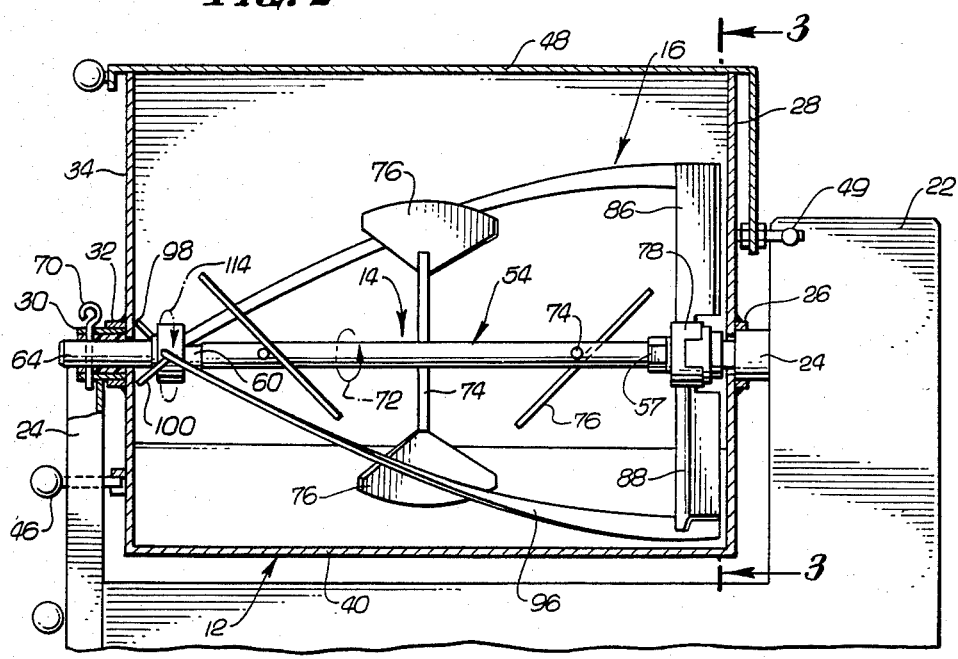

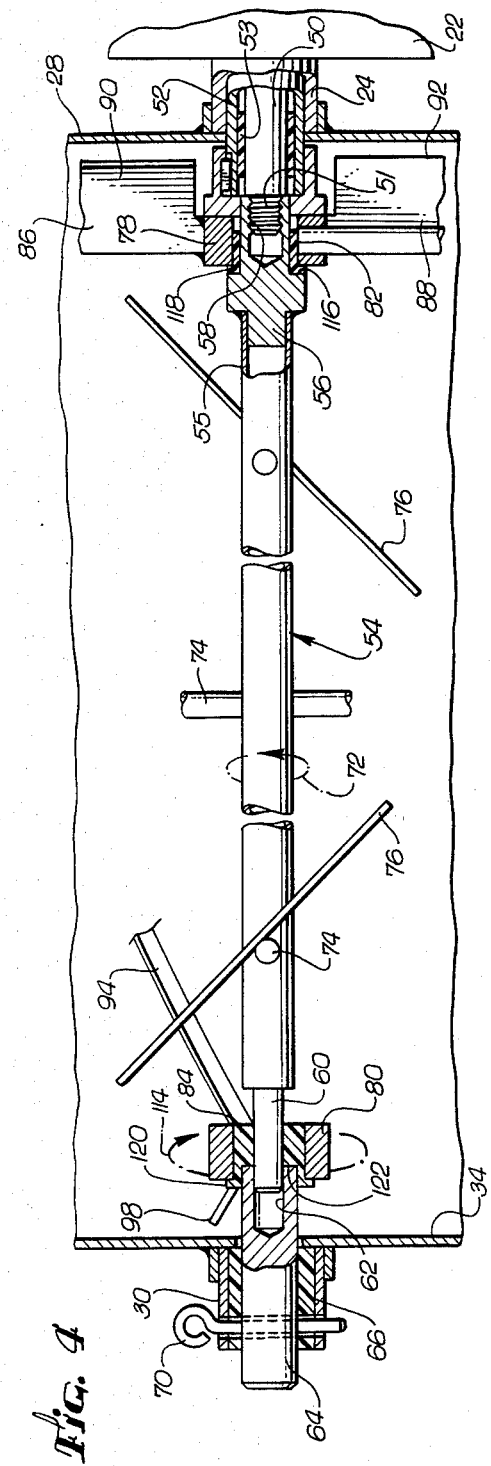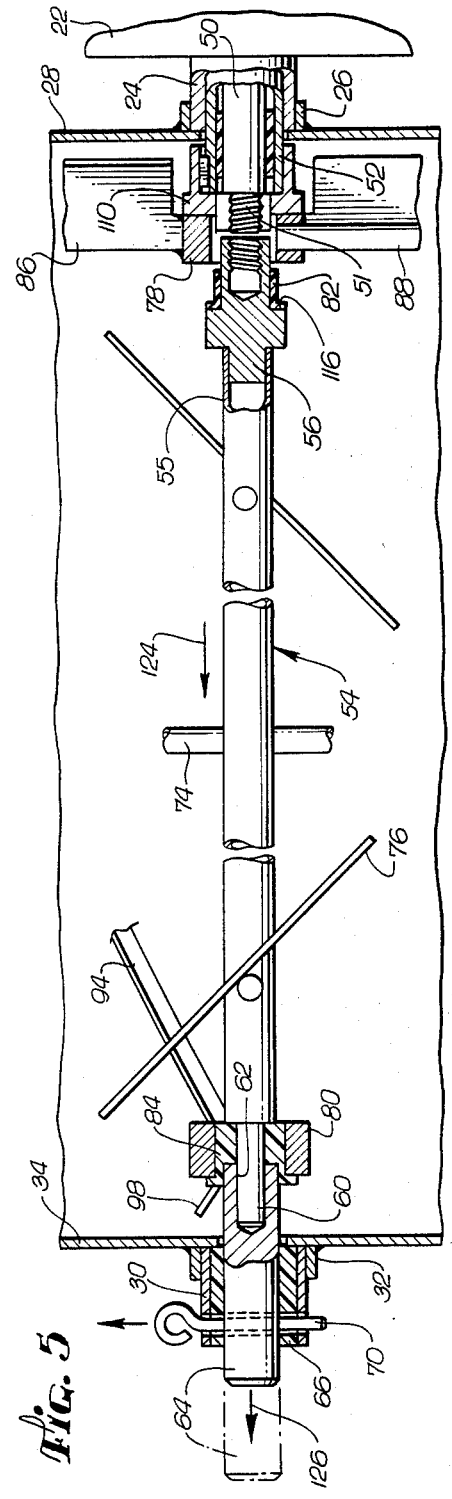

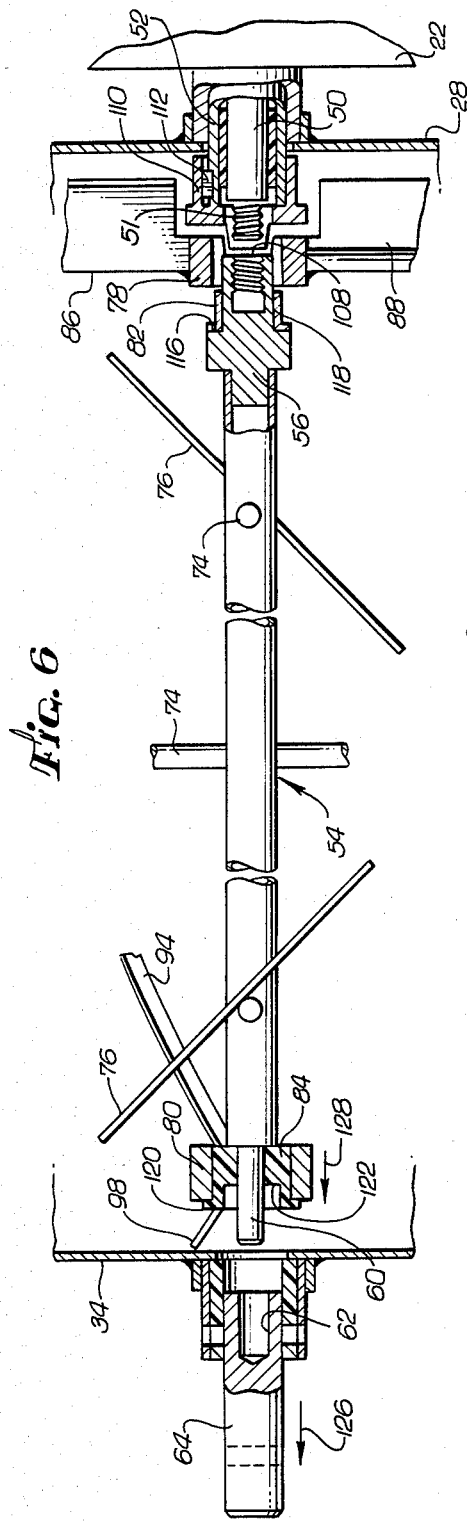
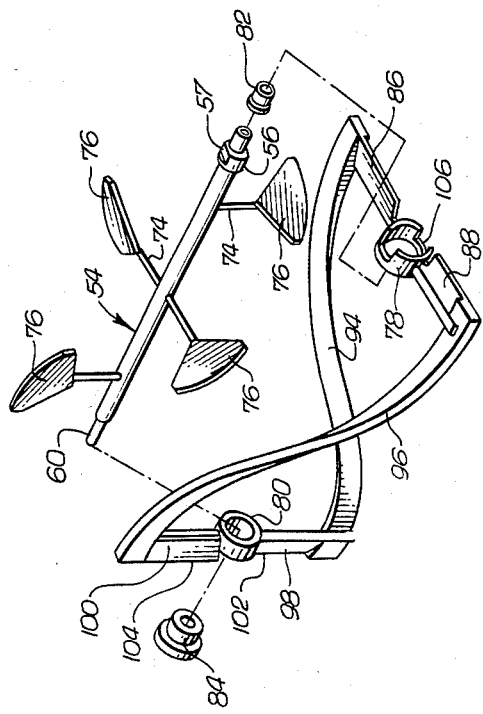

4,509,860

DUAL ACTION MIXER

BACKGROUND OF THE INVENTION

This invention relates generally to improvements in dual action mixers of the type described in U.S. Pat. Nos. 2,784,950; 2,784,951; 3,722,834; and 3,799,959. More specifically, this invention relates to an improved dual action mixer having a pair of counter-rotatable mixing elements which are removable quickly and easily from a mixer drum for cleaning purposes and the like.

So-called dual action mixing devices in general are known in the art to include a pair of rotatable mixing elements installed within a mixer drum to extend generally between opposite end walls of the drum. The two mixing elements are rotatably supported by appropriate bearing structures and drive means for rotatably driving the mixing elements in opposite rotational directions about a common axis of rotation. This simultaneous counterrotation of the mixing elements achieves a relatively rapid and thorough intermixing of ingredients placed within the mixer drum. For example, mixing devices of this type are used commonly in commercial or institutional food preparation and/or packaging facilities to mix various food ingredients in quantities, such as meats and additives, doughs, and the like.

In dual action mixers of this general type, it is necessary to clean the mixing elements and the interior of the mixer drum on a regular and typically daily basis, particularly when the mixer is used for mixture of food products. The mixing elements, however, include a significant number of contoured and complex shaped surfaces which are relatively difficult to access for cleaning purposes and further which tend to restrict cleaning access to various areas of the drum. Accordingly, to maintain the desired level of sanitation, it is necessary to remove the mixing elements from the drum for cleaning. Prior dual action mixers, however, have not been designed for rapid, convenient, and easy removal of the mixing elements, whereby cleaning of such mixers has been a tedious and time-consuming process.

There exists, therefore, a significant need for an improved dual action mixer having a pair of counterrotatable mixing elements installed within a drum for prompt and relatively simple removal when desired for cleaning purposes. The present invention fulfills this need and provides further related advantages.

SUMMARY OF THE INVENTION

In accordance with the invention, an improved mixer of the dual action type is provided with a pair of mixing elements installed within a mixer drum for simultaneous counterrotation to mix ingredients within the drum, wherein the mixing elements are adapted for relatively quick and easy removal after use for cleaning purposes. Such removal of the mixing elements substantially enhances the utility and ease of operation of the dual action mixer by permitting a more rapid and less tedious cleaning of the mixing elements and the drum followed by a relatively simple reinstallation of the mixing elements into the drum ready for a subsequent mixing cycle.

In accordance with the presently preferred form of the invention, the two mixing elements are installed within the mixer drum to extend generally between opposite end walls of the drum. One mixing element comprises a plurality of paddles set angularly at the distal ends of spokes projecting radially from a driven shaft. One end of the driven shaft is threaded axially onto a rotatable drive shaft projecting through one end wall of the mixer drum, whereas the opposite end of the driven shaft is rotatably supported with axial clearance within a bearing block projecting into the drum through the opposite drum end wall.

The other mixing element comprises a pair of support hubs rotatably carried about the driven shaft near the drum end walls. These support hubs are secured to outwardly radiating scraper arms for scraping ingredients from the drum end walls and which are joined at their distal ends to mixer blades extending with arcuate contour between scraper arms at opposite ends of the drum. One of the support hubs includes an axially presented drive surface held by a shoulder on the driven shaft in normal engagement with a drive collar carried about the drive shaft for rotation in a direction opposite thereto.

In operation, the drive shaft rotatably drives the driven shaft and associated paddles in one rotational direction to displace ingredients within the drum from one end wall to the opposite end wall, in accordance with the angular setting of the paddles on the spokes. The drive collar, however, rotatably drives the support hubs and the associated scraper arms and mixer blades in a simultaneously opposite direction to scrape ingredients from the opposite end wall back to the first end wall. This combined dual action rapidly achieves a thorough mixing of the ingredients within the drum.

The mixing elements are removed from the drum when desired by axially unthreading the driven shaft from the drive shaft, as permitted by the axial clearance between the opposite end of the driven shaft within the bearing block. The bearing block is then withdrawn from the drum and the other mixing element is displaced axially to retract the driven support hub from engagement with the driven collar. The two mixing elements are thus freed for lifting together from the drum, after which they are easily separated for cleaning by axial sliding movement relative to one another. Reinstallation of the two mixing members after cleaning is quickly and easily accomplished in a reverse manner.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view illustrating an improved dual action mixer embodying the novel features of the present invention;

FIG. 2 is an enlarged fragmented longitudinal vertical section, partially in side elevation, of the dual action mixer taken generally on the line 2—2 of FIG. 1;

FIG. 3 is a transverse vertical section taken generally on the line 3—3 of FIG. 2;

FIG. 4 is an enlarged fragmented longitudinal vertical section, partially in side elevation, of the mixer and illustrating a pair of mixing elements installed within a mixer drum for normal mixing operation;

FIG. 5 is an enlarged fragmented longitudinal vertical section, partially in side elevation, generally similar to FIG. 4 and illustrating initial steps in removal of the mixing elements from the drum;

FIG. 6 is an enlarged fragmented longitudinal vertical section, partially in side elevation, generally similar to FIG. 5 and illustrating further steps in the removal of the mixing elements from the drum; and FIG. 7 is an exploded perspective view of the mixing elements removed from the drum and illustrating further disassembly thereof.

DETAILED DESCRIPTION OF THE PREFERRED EMBODIMENT

As shown in the exemplary drawings, an improved dual action mixer referred to generally by the reference numeral 10 is provided for rapid and thorough mixing of various ingredients, such as food products and the like. The mixer 10 comprises a relatively large, open-topped drum 12 within which is mounted a pair of simultaneously counterrotatable mixing elements 14 and 16 (FIG. 2) for mixing the desired ingredients. In accordance with the invention, these mixing elements 14 and 16 are removable from the drum relatively quickly and easily for cleaning purposes.

The present invention provides a substantial improvement upon so-called dual action mixers of the type described, by way of example, in U.S. Pat. Nos. 2,784,950; 2,784,951; 3,722,834; and 3,799,959. Such dual action mixers have included mixing elements mounted within a drum for counterrotation about a common axis and have been widely used particularly with food products prior to packaging and/or preparation of a commercial or institutional scale. Use with food products, however, particularly items such as meats subject to relatively rapid spoilage, necessitates regular cleaning of the mixing elements and the drum to maintain the requisite sanitary conditions. Prior dual action mixers have not been designed for convenient or rapid removal of the mixing elements for cleaning purposes, and in this regard, the present invention provides substantial improvements thereover by permitting such facilitated mixing element removal for cleaning.

The improved dual action mixer 10 of this invention has a generally standard external appearance, as shown in FIG. 1, to include a base 18 supported for movement by a set of wheels 20. A motor housing portion 22 projects upwardly from one end of the base 18 and cooperates with an upright column 24 at the opposite end of the base 18 for supporting the mixer drum 12 which is sized for containing typically a significant quantity of ingredients, such as on the order of one hundred pounds or more of meat products and the like. This drum support is achieved, as shown best in FIG. 2, by a tubular casing 24 projecting from the motor housing portion 22 for rotatable reception within a cylindrical boss 26 secured as by welding to one end wall 28 of the drum and a corresponding tubular casing 30 projecting from the upright column 24 for rotatable reception into a cylindrical boss 32 secured as by welding to the opposite end wall 34 of the drum.

The cylindrical bosses 26 and 32 on the opposite end walls of the drum 12 are aligned on a common axis to permit conventional pivoting movement of the drum 12 between the upright position, shown in FIG. 1, and a tilted position (not shown) for facilitated loading and unloading of ingredients. This pivoting movement is accommodated by the shape of the drum side walls 36 which are connected between the end walls 28 and 34 and which further include lower curved segments 38 merging smoothly with a drum bottom wall 40. A semi-circular track 42 is secured to the outboard face of the drum end wall 34 in a position centered generally on the drum pivot axis and includes arcuately spaced recesses 44 which cooperate with a retractable set pin 46 on the column 44 to lock the drum 12 in the selected upright or tilted position, all in a well-known manner. A drum lid 48 may also be provided to close the open top of the drum 12, wherein this lid 48 may be supported conveniently by a hinge 49 at the top of the motor housing portion 22.

As shown best in FIGS. 2-4, the mixing elements 14 and 16 are installed into the mixer drum 12 centered on the drum pivot axis defined by the bosses 26 and 30 and extending generally between the drum end walls 28 and 34. These mixing elements 14 and 16 are connected for rotational driving, respectively, by a drive shaft 50 and a drive sleeve 52 maintained in concentric spaced relation by an interposed friction bushing sleeve 53 of a low friction material. Both the drive shaft 50 and the drive sleeve 52 project from the motor housing portion 22 through the associated tubular casing 24 and further through the drum end wall 28 a short distance into the interior of the drum 12. In operation, the drive shaft 50 and drive sleeve 52 are driven simultaneously in opposite rotational directions by appropriate motor and/or transmission devices (not shown) housed within the motor housing portion 22 and base 18. The motor and/or transmission devices for obtaining this opposite rotational driving of the drive shaft 50 and drive sleeve 52 are conventional in the field of dual action mixers and do not form an integral part of the present invention whereby they are not shown or described in detail herein.

The mixing element 14 comprises a driven shaft 54 shown in the exemplary drawings in the form of a tubular cylinder 55 oriented generally on the central pivot axis of the drum. The driven shaft 54 is rotatably supported at one end by an insert plug 56 secured thereinto as by welding and projecting axially therefrom with a threaded bore 58 for threaded reception of a matingly threaded end 51 of the drive shaft 50. Importantly, the threads on the drive shaft end 51 and within the plug bore 58 are directionally formed to prevent unthreading during rotation of the driven shaft 54 for mixing of ingredients, as will be described herein in more detail.

The opposite end of the driven shaft 54 terminates in a relatively short axle 60 secured to the tubular cylinder 55 in any convenient manner, such as welding, and projecting axially therefrom with a reduced diameter relative to the cylinder 55. This axle 60 fits slidably into a central axial bore 62 at the inboard end of a bearing block 64 movably mounted with respect to the drum end wall 34 normally to project a short distance into the interior of the drum 12. More particularly, the bearing block 64 is seated within a cylindrical bearing sleeve 66 which is in turn received within the tubular casing 30 at the outboard face of the drum end wall 34, with a locking pin 70 being passed through aligned radial openings in the casing 30, the bearing sleeve 66, and the bearing block 64 to releasably secure the bearing block in its normal position against axial or rotational movement within the sleeve 66. In this position, with the driven shaft 54 threaded onto the drive shaft 50 at the opposite drum end wall 28, as shown in FIG. 4, the driven shaft axle 60 is spaced from the base of the bearing sleeve bore 62 by a predetermined minimum axial clearance.

In operation, with the driven shaft 54 installed into the drum 12 as described above, the drive shaft 50 rotatably drives the driven shaft 54 about its own axis, as illustrated by arrow 72 in FIGS. 2 and 4. Such rotation of the driven shaft 54 correspondingly rotates a plurality of spokes 74 secured as by welding to the driven shaft cylinder 55 and projecting radially outwardly therefrom at appropriate axial intervals for connection as by welding to mixing paddles 76. These paddles 76 are angularly oriented relative to their direction of travel during rotation to move ingredients within the drum in a direction generally from the end wall 34 axially toward the opposite end wall 28. In the preferred form, as shown in the exemplary drawings, two of said paddles are set at opposite angles and carried by oppositely radiating spokes of a dual paddle unit disposed centrally within the drum, with two additional paddles respectively mounted on oppositely radiating spokes of single paddle units disposed intermediate the dual paddle unit and the drum end walls.

The other mixing element 16 comprises a pair of cylindrical support hubs 78 and 80 carried for rotation about the driven shaft 54 at positions generally adjacent the drum end walls 28 and 34, respectively. More particularly, the support hubs 78 and 80 are rotatably supported on a respective pair of bushings 82 and 84 formed from a suitable low friction, low wear material, such as nylon plastic or the like. These bushings 82 and 84 are in turn carried about the insert plug 56 and the axle 60 at opposite ends of the driven shaft 54.

The support hub 78 of the mixing element 16 is secured to the inner ends of a pair of oppositely radiating scraper arms 86 and 88 having angularly set edges 90 and 92 in close association with the inboard face of the adjacent drum end wall 28. The distal or radially outer end of these scraper arms 86 and 88 are respectively secured to a pair of elongated mixer blades 94 and 96 which extend in the axial direction through an arcuate contour of about 90 degrees to a position closely adjacent the opposite end wall 34 of the drum. At this location, the mixer blades 94 and 96 are secured respectively to the radially outer ends of a pair of scraper arms 98 and 100 which have blade edges 102 and 104 in close proximity with the adjacent end wall 34 of the drum 12 and which further have their inner ends secured to the support hub 80. This latter pair of scraper arms 98 and 100 is oriented at an angle of about 90 degrees relative to the scraper arms 86 and 88 by virtue of the arcuate contour of the mixer blades 94 and 96.

The support hub 78 includes an axially presented drive surface shown best in FIGS. 5-7 as a pair of relatively large axially open recesses 106 formed therein. These recesses 106 are provided for mating reception of correspondingly shaped drive teeth 108 projecting axially from a drive collar 110 carried about the inboard end of the drive sleeve 52 and secured for rotation therewith by a key 112 or the like. Accordingly, in operation, the drive sleeve 52 and the drive collar 110 rotatably drive the mixing element 16 via the support hub 78 in a rotational direction opposite that of the drive shaft 50, wherein this opposite rotational direction is illustrated in FIGS. 2 and 4 by arrow 114. Importantly, the radial dimensions of the sets of scraper arms 88, 86 and 98, 100 are sufficient to avoid interference of the mixer blades 94 and 96 with the mixer paddles 76 during mixing element rotation.

When the driven shaft 54 of the mixing element 14 is threaded onto the drive shaft 50, as described above, the support hub 78 of the other mixing element 16 is held in normal driving engagement with the drive collar 110. More particularly, as shown best in FIGS. 4-6, the insert plug 56 of the driven shaft 54 includes a radially enlarged shoulder 116 for holding the support hub 78 in driving engagement with the drive collar 110, with a radially directed flange 118 on the adjacent bushing 82 being conveniently interposed between the shoulder 116 and hub 78 to prevent undue wear thereto.

At the opposite end of the driven shaft 54, means are provided for retaining the low friction bushing 84 in the desired axial position concentrically between the driven shaft axle 60 and the surrounding support hub 80. More particularly, the bushing 84 includes an outwardly radiating flange 120 at one end thereof to prevent axial migration of the bushing in a direction away from the adjacent drum end wall 34. Axial bushing displacement in an opposite direction is prevented by the inboard end of the bearing block 64 which bears against the bushing 84 conveniently within a relatively shallow counterbore 122 formed for partial reception of the bearing block 64.

In operation of the dual action mixer 10, the drive shaft 50 rotates the driven shaft 54 and associated paddles 76 in one rotational direction, whereas the drive sleeve 52 and collar 110 cooperate to drive the support hubs 78 and their associated scraper arms and mixer blades in an opposite rotational direction. The angularly set paddles function to move ingredients within the drum from the end wall 34 axially toward the opposite end wall 28. At the same time, however, the scraper blades 86 and 88 tend to scrape ingredients from the end wall 28 whereupon the arcuate contour of the mixer blades 94 and 96 moves the ingredients back to the opposite end wall 34. This results in a dual mixing action which rapidly and thoroughly mixes ingredients within the drum.

Subsequent to a mixing operation, such as mixture of various food products, the mixing elements 14 and 16 are quickly and easily removable from the drum. This permits facilitated cleaning of the mixing elements outside the drum and further permits convenient full access to interior surfaces of the drum for cleaning. Accordingly, the mixing elements 14 and 16 and drum 12 can be maintained in the desired highly sanitary condition.

Removal of the mixing elements 14 and 16 from the drum 12 is accomplished by unthreading the driven shaft 54 from the drive shaft 50, wherein unthreading conveniently can be initiated by engagement of flat surfaces 57 on the insert plug 56 with a suitable wrench (not shown). Such unthreading movement axially retracts the driven shaft 54 from the drive shaft 50 in the direction of arrow 124 in FIG. 5, thereby moving the driven shaft axle 60 to a position projecting further into the bore 62 of the bearing block 64. Importantly, the length of the driven shaft is chosen such that uncoupling with the drive shaft 50 occurs when the end of the axle 60 is disposed at least slightly within the interior of the drum 12.

The bearing block 64 is then withdrawn from the drum 12 by retracting the locking pin 70 and pulling the bearing block 64 in the direction of arrow 126 in FIGS. 5 and 6. This leaves the drive shaft axle 60 unsupported, at which time the support hubs 78 and 80 of the mixing element 16 can be moved axially in the direction of arrow 128 sufficiently to disengage the hub 78 from the drive collar 110. At this time, both mixing elements 14 and 16 can be lifted together substantially without restriction from the drum 12 for cleaning. Further disassembly of the mixing elements may be accomplished outside the drum, as illustrated in FIG. 7, by removal of the bushing 84 to permit sufficient axial sliding of the driven shaft 54 within the hubs 78 and 80 to separate the driven shaft 54 and the bushing 82 at the opposite end thereof.

Subsequent to thorough cleaning of the mixing elements 14 and 16 and the interior surfaces of the drum 12, the mixing elements can be quickly and easily reinstalled into the drum in a reverse manner of the removal process. More particularly, the mixing elements 14 and 16 can be reassembled with the bushings 82 and 84 followed by reinsertion into the drum 12. The support hub 78 of the mixing element 16 is easily moved into axial reengagement with the drive collar 110 whereupon the bearing block 64 is returned to its normal position rotatably supporting the axle 60 of the driven shaft 54. The driven shaft 54 is then rethreaded onto the threaded end 51 of the drive shaft 50 at which time the mixing elements 14 and 16 are ready for a subsequent mixing cycle.

The improved dual action mixer of this invention thus provides counterrotatable mixing elements 14 and 16 for achieving the highly desirable dual action mixing of ingredients, such as food products and the like. The mixing elements 14 and 16 are supported for such counterrotation in a manner permitting facilitated removal of the mixing elements for cleaning purposes, thereby enhancing the utility and ease of operation of the dual action mixer.

A variety of modifications and improvements to the invention described herein are believed to be apparent to one of ordinary skill in the art. Accordingly, no limitation on the invention is intended, except by way of the appended claims.

What is claimed is:

1. A dual action mixer, comprising:
   a mixer drum having opposed first and second end walls;
   a drive shaft projecting through said first end wall and including a threaded end portion within said drum;
   a drive sleeve disposed about said drive shaft and projecting through said first end wall into said drum;
   a bearing block supported at said second end wall generally in coaxial alignment with said drive shaft and movable between a normal position projecting into said drum and a retracted position substantially withdrawn from said drum;
   a first mixing element including a driven shaft having one end threaded for generally coaxial driving connection with said drive shaft threaded end portion and an opposite end rotatably supported by said bearing block when said block is in the normal position for sufficient axial sliding movement to permit connection and disconnection of said driven shaft with said drive shaft, said first mixing element further including a plurality of first mixing members radiating outwardly from said driven shaft;
   a second mixing element including a pair of support hubs rotatably supported generally at opposite ends of said driven shaft, said support hubs being coupled for rotation together by a plurality of outwardly radiating and axially extending second mixing members; and
   means for coupling one of said support hubs with said drive sleeve for rotation of said second mixing element when said driven shaft of said first mixing element is drivingly connected to said drive shaft; said first and second mixing elements being removable from said drum upon disconnection of said driven shaft from said drive shaft, movement of said bearing block to the retracted position, and uncoupling of said one support hub from driving relation with said drive sleeve.

2. The dual action mixer of claim 1 wherein said drive shaft and drive sleeve are rotatable in opposite directions.

3. The dual action mixer of claim 1 including means for releasably locking said bearing block in the normal position.

4. The dual action mixer of claim 3 wherein said bearing block is supported within a tubular casing mounted on said second end wall of said drum, and wherein said locking means comprises a locking pin for reception through radially presented openings formed in said tubular casing and bearing block in positions for radial alignment when said block is in the normal position.

5. The dual action mixer of claim 1 wherein said bearing block has a bore formed therein for rotational and axial sliding reception of said driven shaft opposite end, said bore having sufficient depth to permit axial sliding movement of said driven shaft opposite end to a position further within said bore upon unthreading movement of said driven shaft threaded end relative to said drive shaft.

6. The dual action mixer of claim 5 wherein said driven shaft has a length such that said driven shaft opposite end is disposed at least slightly within said drum when said driven shaft threaded end is disconnected from said drive shaft.

7. The dual action mixer of claim 1 wherein said coupling means comprises a drive surface formed on said one support hub and presented axially toward said drive sleeve, a mating drive surface associated with said drive sleeve and presented axially toward said one support hub, and shoulder means on said driven shaft for retaining said one support hub in an axial position with said hub drive surface in engagement with said sleeve drive surface when said driven shaft is drivingly connected with said drive shaft, said shoulder means being retracted axially from said one support hub upon disconnection of said driven shaft from said drive shaft to permit axial retraction of said one support hub from driving engagement with respect to said drive sleeve.

8. The dual action mixer of claim 7 wherein said sleeve drive surface is formed on a drive collar mounted on said drive sleeve for rotation therewith.

9. The dual action mixer of claim 7 wherein said support hub drive surface comprises at least one relatively large, axially presented recess formed in said one support hub, and wherein said sleeve drive surface comprises a number of relatively large, axially projecting drive teeth corresponding in number with the number of recesses formed in said one support hub and having a size, shape, and position for mating reception thereinto.

10. The dual action mixer of claim 1 including a pair of bushings interposed respectively between said pair of support hubs and said drive shaft, and means for preventing axial displacement of said bushings relative to their associated support hubs upon rotation of said support hubs and said driven shaft.

11. The dual action mixer of claim 10 wherein said coupling means comprises axially presented and matingly engageable drive surfaces formed on said one support hub and associated with said drive sleeve, respectively, and shoulder means on said driven shaft for retaining said one support hub in an axial position with said drive surfaces matingly engaged when said driven shaft is drivingly connected to said drive shaft, said axial displacement preventing means for the one of said bushings between said driven shaft and said one support hub comprising a radial flange interposed between said shoulder means and the axial side of said one support hub opposite said drive sleeve.

12. The dual action mixer of claim 1 wherein said first mixing members comprise a plurality of spokes having inner ends secured to said driven shaft and outer ends carrying angularly set paddles for mixing ingredients within said drum.

13. The dual action mixer of claim 12 wherein said first mixing members comprise first and second spokes radiating oppositely generally from the axial center of said driven shaft and having paddles thereon respectively set at generally opposite angles, a third spoke radiating generally perpendicular to said first and second spokes at an axial position generally intermediate said first and second spokes and said first end wall and having a paddle thereon set at an angle generally corresponding with said paddle on said first spoke, and a fourth spoke radiating generally opposite said third spoke at an axial position generally intermediate said first and second spokes and said second end wall and having a paddle thereon set at an angle generally corresponding with said paddle on said second spoke.

14. The dual action mixer of claim 12 wherein said second mixing members comprise pairs of scraper arms secured respectively to said pair of support hubs and radiating oppositely therefrom with edges in close association with said first and second end walls of said drum to scrape ingredients therefrom, and a pair of axially extending mixer blades each connected between a pair of said scraper arms respectively adjacent said first and second end walls, said mixer blades being positioned outwardly relative to said paddles to avoid interference therewith during rotation of said first and second mixing elements.

15. The dual action mixer of claim 14 wherein said pairs of scraper arms secured to said one support hub are oriented generally perpendicular to the pair of scraper arms secured to the other support hub, said mixer blades each extending axially with arcuate contour between the pair of scraper arms connected thereto.

16. A dual action mixer, comprising:
a mixer drum having opposed first and second end walls;
a drive shaft at said first end wall;
a drive sleeve disposed about said drive shaft;
a bearing block supported at said second end wall generally in coaxial alignment with said drive shaft and movable between a normal position projecting into said drum and a retracted position substantially withdrawn from said drum;
a first mixing element including a driven shaft having one end for generally coaxial driving connection with said drive shaft and an opposite end for rotatable support by said bearing block when said block is in the normal position, said driven shaft being axially movable relative to said drive shaft and bearing block between a first position advanced toward said drive shaft for driving connection thereto and a second position retracted from said drive shaft for disconnection therefrom, said first mixing element further including first mixing members mounted on said driven shaft;
a second mixing element including second mixing members mounted on a pair of support hubs rotatably supported generally at opposite ends of said driven shaft; and
means for coupling one of said support hubs with said drive sleeve for rotation of said second mixing element when said driven shaft of said first mixing element is drivingly connected to said drive shaft;
said first and second mixing elements being removable from said drum upon disconnection of said driven shaft from said drive shaft, movement of said bearing block to the retracted position, and uncoupling of said one support hub from driving relation with said drive sleeve.

17. The dual action mixer of claim 16 wherein said drive shaft and said drive sleeve project through said first end wall a short distance into said drum.

18. The dual action mixer of claim 16 wherein said drive shaft has a threaded end portion, and wherein said driven shaft one end is threaded for threaded connection with said drive shaft threaded end portion.

19. The dual action mixer of claim 16 wherein said drive shaft and drive sleeve are rotatable in opposite directions.

20. The dual action mixer of claim 16 including means for releasably locking said bearing block in the normal position.

21. The dual action mixer of claim 16 wherein said driven shaft has a length such that said driven shaft opposite end is disposed at least slightly within said drum when said driven shaft is disconnected from said drive shaft.

22. The dual action mixer of claim 16 wherein said coupling means comprises axially presented and matingly engageable drive surfaces formed on said one support hub and associated with said drive sleeve, respectively, and shoulder means on said driven shaft for retaining said one support hub in an axial position with said drive surfaces matingly engaged when said driven shaft is drivingly connected to said drive shaft, said shoulder means being retracted axially from said one support hub upon disconnection of said driven shaft from said drive shaft to permit axial retraction of said one support hub from driving engagement with respect to said drive sleeve.

23. The dual action mixer of claim 22 further including a bushing interposed between said one support hub and said driven shaft, said bushing having a radial flange disposed axially between said shoulder means and the axial side of said one support hub opposite said drive sleeve.

24. The dual action mixer of claim 16 wherein said first mixing members comprise a plurality of spokes having inner ends secured to said driven shaft and outer ends carrying angularly set paddles for mixing ingredients within said drum.

25. The dual action mixer of claim 24 wherein said second mixing members comprise pairs of scraper arms secured respectively to said pair of support hubs and radiating oppositely therefrom with edges in close association with said first and second end walls of said drum to scrape ingredients therefrom, and a pair of axially extending mixer blades each connected between a pair of said scraper arms respectively adjacent said first and second end walls, said mixer blades being positioned outwardly relative to said paddles to avoid interference therewith during rotation of said first and second mixing elements.

26. A dual action mixer, comprising:
a mixer drum having opposed first and second end walls;
a drive shaft projecting through said first end wall and including a threaded end portion within said drum;
a drive sleeve disposed about said drive shaft and projecting through said first end wall into said drum;
a bearing block supported at said second end wall generally in coaxial alignment with said drive shaft and movable between a normal position projecting into said drum and a retracted position substantially withdrawn from said drum;
a first mixing element including a driven shaft having one end threaded for generally coaxial driving connection with said drive shaft threaded end portion and an opposite end rotatably supported by said bearing block when said block is in the normal position for sufficient axial sliding movement to permit connection and disconnection of said driven shaft with said drive shaft, said first mixing element further including a plurality of first mixing members radiating outwardly from said driven shaft and including angularly set mixer paddles for mixing ingredients within said drum upon rotation of said driven shaft;
a second mixing element including a pair of support hubs rotatably supported generally at opposite ends of said driven shaft, said support hubs each being secured to a respective pair of outwardly radiating scraper arms in close association respectively with said first and second end walls, a first mixer blade connected between one of said scraper blades of each pair, and a second mixer blade connected between the other of said scraper blades of each pair, said mixer blades being radially positioned for clearance relative to said paddles;
one of said support hubs and said drive sleeve including axially presented and matingly engageable drive surfaces formed respectively thereon; and
shoulder means on said driven shaft for retaining said one support hub in an axial position with said drive surfaces matingly engaged when said driven shaft is drivingly connected to said drive shaft, said shoulder means being retracted axially from said one support hub upon disconnection of said driven shaft from said drive shaft to permit axial retraction of said one support hub from driving engagement with respect to said drive sleeve;
said first and second mixing elements being removable from said drum upon disconnection of said driven shaft from said drive shaft, movement of said bearing block to the retracted position, and uncoupling of said one support hub from driving relation with said drive sleeve.

27. The dual action mixer of claim 26 wherein said drive shaft and drive sleeve are rotatable in opposite directions.

28. The dual action mixer of claim 26 including a pair of bushings interposed respectively between said pair of support hubs and said drive shaft, and means for preventing axial displacement of said bushings relative to their associated support hubs upon rotation of said support hubs and said driven shaft.

29. The dual action mixer of claim 26 wherein said first mixing members comprise first and second spokes radiating oppositely generally from the axial center of said driven shaft and having paddles thereon respectively set at generally opposite angles, a third spoke radiating generally perpendicular to said first and second spokes at an axial position generally intermediate said first and second spokes and said first end wall and having a paddle thereon set at an angle generally corresponding with said paddle on said first spoke, and a fourth spoke radiating generally opposite said third spoke at an axial position generally intermediate said first and second spokes and said second end wall and having a paddle thereon set at an angle generally corresponding with said paddle on said second spoke.

30. The dual action mixer of claim 26 wherein said pairs of scraper arms secured to said one support hub are oriented generally perpendicular to the pair of scraper arms secured to the other support hub, said mixer blades each extending axially with arcuate contour between the pair of scraper arms connected thereto.

31. In a dual action mixer having a coaxial drive shaft and counterrotatable drive sleeve projecting through a first end wall of a mixer drum having opposite first and second end walls, removable mixing apparatus, comprising:
a bearing block supported at said second end wall generally in coaxial alignment with said drive shaft and movable between a normal position projecting into said drum and a retracted position substantially withdrawn from said drum;
a first mixing element including a driven shaft having one end for generally coaxial driving connection with said drive shaft and an opposite end for rotatable support by said bearing block when said block is in the normal position, said driven shaft being axially movable relative to said drive shaft and bearing block between a first position advanced toward said drive shaft for driving connection thereto and a second position retracted from said drive shaft for disconnection therefrom, said first mixing element further including first mixing members mounted on said driven shaft;
a second mixing element including second mixing members mounted on a pair of support hubs rotatably supported generally at opposite ends of said driven shaft; and
means for coupling one of said support hubs with said drive sleeve for rotation of said second mixing element when said driven shaft of said first mixing element is drivingly connected to said drive shaft;
said first and second mixing elements being removable from said drum upon disconnection of said driven shaft from said drive shaft, movement of said bearing block to the retracted position, and uncoupling of said one support hub from driving relation with said drive sleeve.

* * * * *